Jan. 26, 1954 W. B. WALLOWER 2,667,565
THERMOSTATIC CONTROL FOR COFFEE MAKERS
Filed Dec. 20, 1950 2 Sheets-Sheet 1

INVENTOR
WILLIAM B. WALLOWER
BY
ATTORNEY

INVENTOR
WILLIAM B. WALLOWER
BY
ATTORNEY

Patented Jan. 26, 1954

2,667,565

UNITED STATES PATENT OFFICE 2,667,565

THERMOSTATIC CONTROL FOR COFFEE MAKERS

William B. Wallower, Mansfield, Ohio, assignor to Westinghouse Electric Corporation, East Pittsburgh, Pa., a corporation of Pennsylvania Application December 20, 1950, Serial No. 201,837

9 Claims. (Cl. 219—43)

This invention relates to a thermostatic control and more particularly to a two-temperature thermostatic control having an inherently snap-acting bimetal member. Although not limited thereto, this thermostatic control is especially suited to control an automatic coffee maker in which the coffee is brewed at one temperature and thereafter maintained at a lower or drinking temperature.

An inherently snap-acting bimetal member, of either the strip or disc type, will flex with a snap action in one direction upon being heated to a first temperature and will reflex, that is, flex in the reverse direction, upon being cooled to a second and lower temperature. Thus, assume for example, an unrestrained member of either of these types which snaps in one direction upon being heated to 220° F. and subsequently snaps in the reverse direction upon being cooled to 150° F. After snapping in the one direction due to temperature rise, any variation in temperature above 150° F. will cause the bimetal to creep to a position of greater or less curvature similarly to a creep type bimetal. It will be noted that this creep action is effective as long as the temperature is maintained above 150° F. and that upon cooling to 150° F., the member will suddenly reverse its curvature and snap in the reverse direction. Conversely, after the member has snapped in the opposite direction due to temperature drop, any variation in temperature below 220° F. will cause the bimetal to creep to a position of greater or less curvature similarly to a creep type bimetal. Upon heating to 220° F. the member will suddenly again reverse its curvature and snap in the one direction. In the illustrated embodiments, I take advantage of the creeping action which occurs after the bimetal has snapped in the one direction upon heating, and I utilize especially the creeping action which occurs between the temperatures at which snapping occurs.

It is an object of this invention to provide a thermostatic control in which a single thermostatic member serves to control at one temperature initially and at another temperature thereafter.

It is another object of this invention to provide a thermostatic control in which a single thermostatic member serves to control at a high temperature initially and at a lower temperature thereafter.

It is still another object of this invention to provide a thermostatic control in which an inherently snap-acting thermostatic member serves to control at a high temperature initially and at a lower temperature thereafter.

A further object of this invention is to provide a thermostatic control in which an inherently snap-acting thermostatic member is so arranged as to terminate a first heating cycle with a snap-action and to subsequently initiate and control a second heating cycle at a lower temperature.

For illustration purposes, this invention has been incorporated in a control for an automatic coffee maker in which the heating means is de-energized, by the snap action of an inherently snap-acting bimetal member, after the water attains a brewing temperature and in which the heating means is then controlled to maintain the brew at a drinking temperature by creep action of the same member.

These and other objects are effected by the invention as will be apparent from the following description and claims taken in connection with the accompanying drawings, forming a part of this application, in which:

Fig. 1 shows a vacuum type coffee maker, in vertical section, incorporating my thermostatic control mounted in inverted position;

Fig. 2 is a plan of the thermostatic control;

Fig. 3 is a front elevation of the thermostatic control;

Fig. 4 is a schematic view showing the various positions of curvature assumed by the snap-acting bimetallic element;

Figure 5:
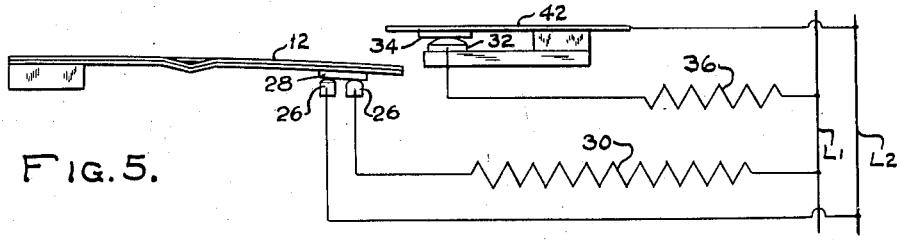
Fig. 5 is a schematic view of the control, in the same position as in Fig. 3, showing its electrical connections.

As shown in the drawings, especially Figs. 2, 3 and 4, my improved thermostatic control generally designated 10 is unitary in structure and comprises a snap-acting bimetal strip member 12 having two parallel slots 14 disposed on either side of its central axis which define a center leg 16 and two outer legs 18. The outer legs are crimped as at 20 or otherwise shortened, thereby putting a compressive force on the center leg. The bimetal strip 12 is free at one end and is hingedly attached to a U-shaped bracket 22 by an L-shaped spring member 24. The U-shaped bracket serves as a mounting structure for the various components which comprise the control and carries a pair of contacts 26 which cooperate with a bridging contact bar 28 carried by the bimetal member at its free end to form a set of contacts which make and break a circuit through a high wattage heater 30. These contacts will be termed the high temperature contacts.

The bimetal strip is disposed with its high expansion metal component on its bottom side as seen in Fig. 3; hence, in a cool state, the bimetal will be curved downwardly and the high temperature contacts 26 and 28 will be in engagement with each other.

A second set of cooperating contacts including a stationary contact 32 and a movable contact 34 are provided for making and breaking an electrical circuit through a low wattage heater 36. These contacts will be termed the low temperature contacts.

The low temperature contacts are disposed adjacent the free end of the bimetal member 12 and are mounted on a Z-shaped bracket 38 which is fastened to the bracket 22. The stationary contact 32 has a threaded shank 40 and is held in adjustable threaded engagement with the Z-shaped bracket by a locknut. The movable contact 34 is carried by a flexible spring arm 42 which is riveted at one end or otherwise fastened to the Z-shaped bracket. The spring arm 42 inherently biases contact 34 into engagement with contact 32 and has its free end disposed above the free end of the bimetal 12. A button 44 of insulating material may be attached to the free end of the spring arm 42.

It will be understood that the high temperature contacts and the low temperature contacts may be insulated where necessary, in accordance with well-known practice.

Referring to the wiring diagram shown in Fig. 5, the high wattage heater 30 has one terminal connected to one line $L_1$ of a power supply and its other terminal is connected to one of the contacts 26. The other contact 26 is connected to the other line $L_2$ of the power supply. Thus, when the bimetal 12 is in a cool or snap closed position, its bridging contact 28 completes a circuit through heater 30.

The low wattage heater 36 has one terminal connected to line $L_1$ and its other terminal connected to contact 32. Switch arm 42 is connected to the line $L_2$. Thus, when contacts 32 and 34 are in engagement, a circuit through heater 36 is provided which is parallel to the circuit through the heater 30.

The various positions of the bimetal member 12 are shown schematically in Fig. 4. An unrestrained bimetal will first be considered. When an unrestrained bimetal (assumed to be initially hot) is cooled below its snap-closing temperature, it will assume the unrestrained position shown at 46. Further cooling will cause the bimetal to move downwardly with a creep action, while an increase in temperature will cause it to move upwardly with a creep action until it assumes the dotted line position shown at 47. However, any further increase in temperature will cause the bimetal to flex upwardly with a snap action through the unrestrained snap-opening travel to the position shown at 48 in which it has an opposite curvature. The temperature at which the bimetal snaps upwardly from position 47 will be termed the snap-opening temperature of the unrestrained bimetal. After the bimetal has assumed the position shown at 48, further increase in temperature will cause it to move upwardly with a creep action, while a decrease in temperature will cause it to move downwardly with a creep action until it assumes the position shown at 50. It will be understood that any rise in temperature will return the bimetal toward position 48 and any fall in temperature will cause it to approach 50. However, when the temperature drops below the point at which the curvature 50 is attained, the bimetal will reflex with a snap action through the unrestrained snap-closing travel to its former position shown at 46. The above series of positions will be attained indefinitely in a definite sequence provided the temperature varies accordingly.

The bimetal member 12 will now be considered when it is restrained in contact-closing direction. As mentioned above, when the bimetal member reflexes through its unrestrained snap-closing travel it will assume the position shown at 46. Contacts 26, however, act as a stop, limiting the downward movement of the bimetal to the position shown at 52. This position of curvature, which will be termed the closed position, restrains the bimetal from creeping upwardly or downwardly with variations in temperature. It will be noted that the restrained position 52 is above the unrestrained snap-opening position 47. The snap-opening temperature of the bimetal member has, in effect, been lowered by the restraining effect of the contacts 26. The remainder of the positions of the bimetal member, however, have not been affected and will occur as previously described in connection with the unrestrained bimetal. The snap-opening temperature may be adjusted without affecting the snap-closing temperature or the creeping action of the bimetal after snap-opening by adjusting the position of the contacts 26 with respect to the secured end of bimetal member, thereby shifting the restrained position 52 vertically. The adjustment may be effected by shifting the secured end of the bimetal member, as will be subsequently described.

Figure 6:
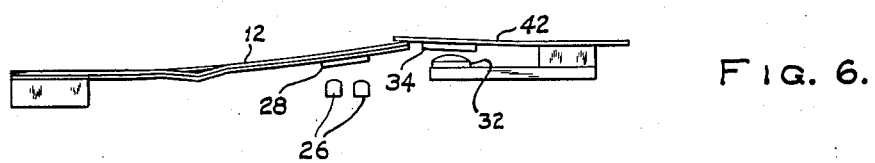
Figs. 6 and 7 are schematic views showing the control in different operating positions.
Figure 7:
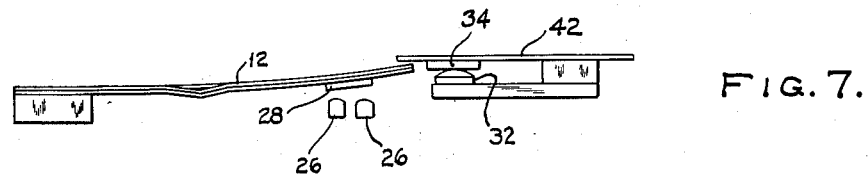

The operation of my improved thermostatic control will now be described. As shown in Fig. 5, when the bimetal 12 is cool, current will flow through both heaters 30 and 36. As the bimetal member 12 is heated, it will attain its opening temperature and will subsequently snap to its open position, as shown in Fig. 6, opening the circuit through the high wattage heater 30. As the bimetal member snaps upwardly, it will strike the flexible arm 42 and flex it upwardly, causing the movable contact 34 to move away from contact 32, thus also breaking the circuit through the low wattage heater 36. In this position, the delivery of heat is interrupted and the bimetal member will gradually cool. As it cools, it will move downwardly with a creep action until it loses contact with the arm 42, as shown in Fig. 7. Contact 34 will move into engagement with its mating contact 32, completing the circuit through low wattage heater 36. The heat from the low wattage heater will prevent further cooling of the bimetal, thus preventing it from snapping to the closed position. Since the wattage of the low wattage heater is sufficient to maintain the second temperature, any increase in temperature of the bimetal will cause it to rise correspondingly with a creep action to again open the contacts 32 and 34, as shown in Fig. 6. This cycling will continue as long as desired. To restore the control to its original setting it is only necessary that it be disconnected from the power supply $L_1$, $L_2$. The bimetal will then gradually cool to its snap closing temperature and will flex downwardly with a snap action to reclose all the contacts as shown in Figs. 3 and 5.

As illustrated in Figs. 2 and 3, the spring member 24 is inherently biased in the direction to urge the bimetal 12 downwardly. A rigid L-shaped member 54 is fastened to the bimetal, and an adjusting screw 56 in threaded engagement with the bracket 22 abuts the member 54 in the direction to oppose the biasing effect of the spring. The adjusting screw is thus in constant abutment with the member 54 and acts to position the bimetal. To raise the opening temperature of the high temperature contacts, the adjusting screw 56 is turned inwardly, i. e., to the right, decreasing the pressure of the bimetal against the contacts 26 in the circuit closed position. To lower the opening temperature, the screw 56 is unscrewed or moved to the left, thus increasing the pressure on the bimetal. To adjust the operating temperature of the low temperature contacts, the stationary contact 32 may be moved upwardly or downwardly as necessary, after temporarily loosening the lock nut to permit adjustment.

Although not limited thereto, for purposes of illustration, I have shown my improved control 10 incorporated in a vacuum type coffee maker, as shown in Fig. 1 and generally designated 60. As well known in the art, this type of coffee maker generally is provided with a lower water heating bowl 62 and an upper coffee infusion bowl 64. The lower bowl 62 is preferably made of metal and has a large upper opening 66 and a carrying handle 68. An inner cup-shaped shell 70 is disposed within the lower bowl 62 and the high wattage heater element 30 and the low wattage heater element 36 may be of annular shape, embracing the shell 70 in good heat transmitting relation therewith. Thus, the lower bowl is adapted to be filled with water through the opening 66 and to electrically heat the water when connected with the power supply as is well understood.

The upper bowl 64 is adapted to be superimposed on the lower bowl 62 and is provided with an annular gasket 72 of resilient construction which fits within the opening 66 to effect a vapor proof seal between the lower bowl and the atmosphere. The upper bowl is provided with a depending tube portion 74. Thus, when the two bowls are in registry, the tube 74 acts as a vertical communicating passage between them. A filter 76 is inserted within the upper bowl 64 to filter the brew after the infusion period is terminated.

My improved thermostatic control 10 is preferably disposed in inverted position on the bottom surface of the shell 70 in good heat-transfer relation therewith. As well understood in the art, the control may be provided with a pair of prongs 78 for connecting the coffee maker to the power supply line by an appliance cord having a female connector adapted to receive the prongs 78.

After the bowl 62 is filled with water and the upper bowl is charged with coffee, the appliance is connected to the power supply to initiate the coffee making cycle. As previously described, since the bimetal 12 is cool, current will flow through both heaters 30 and 36. As the water attains the boiling point, steam pressure within the lower bowl 62 will force the water upwardly through the communicating tube 74 to the upper bowl 64. The bimetal 12 will subsequently attain its opening temperature and will snap downwardly, opening the circuit through the high wattage heater 30 and causing the flexible arm 42 to flex downwardly, thus also breaking the circuit through the low wattage heater 36. In this position, no heat is delivered to the lower bowl 62; consequently as the steam condenses within the lower bowl, a partial vacuum will be created which will force the brew into the lower bowl. As the bimetal subsequently cools, it will move upwardly with a creep action and initiate the cycling control of the low wattage heater 36. The heat from the low wattage heater is sufficient to maintain the coffee at a drinking temperature and since this temperature is above the snap-closing temperature of the bimetal, the contacts 26 to the heater 30 will not be bridged. Cycling of the low wattage heater will continue thereafter as long as desired to maintain the coffee at a drinking temperature.

It will be seen that I have provided a simple and inexpensive two-temperature control in which the heavy current drawn by the high wattage heater is interrupted with a snap action to prevent excessive arcing and pitting of the contacts, while the low wattage heater is controlled by creep action.

Figures 8, 9:
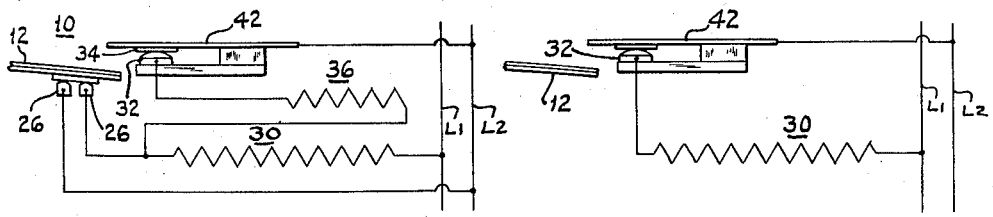
Figs. 8 and 9 are schematic views similar to Fig. 5 but showing other heater arrangements.

Referring to Fig. 8, there is shown a schematic diagram in which my thermostatic control 10 is shown in conjunction with a modified arrangement of the high wattage heater 30 and the low wattage heater 36. All the wiring connections are the same as previously shown and described in connection with Fig. 5; however, one of the low wattage heater terminals is connected to the wire joining the high temperature contact 26 and the heater 30. In operation, when all contacts are closed both heaters are energized. However, the high wattage delivered will be chiefly received from the high wattage heater, since the low wattage heater is in shunt with the high wattage heater. When the high temperature contacts are open and the low temperature contacts are closed, the two heaters are connected in series and low wattage will be delivered. It is to be understood that the control 10 operates as previously described.

Referring to Fig. 9, there is shown a schematic diagram in which my thermostat control is shown in conjunction with another heating arrangement. In this arrangement the low wattage heater has been omitted and the high wattage heater 30 is utilized to provide both the high temperature and the low temperature. The heater 30 has one terminal connected to line $L_1$ and the other terminal connected to contact 32 and the high temperature contacts 26 and 28 are omitted entirely. With this arrangement the contacts 32 and 34 act as high temperature contacts on the first cycle to open the circuit through the heater 30 with snap action, and thereafter act as low temperature contacts to recurrently open and close the circuit through the heater with creep action.

Figure 10:
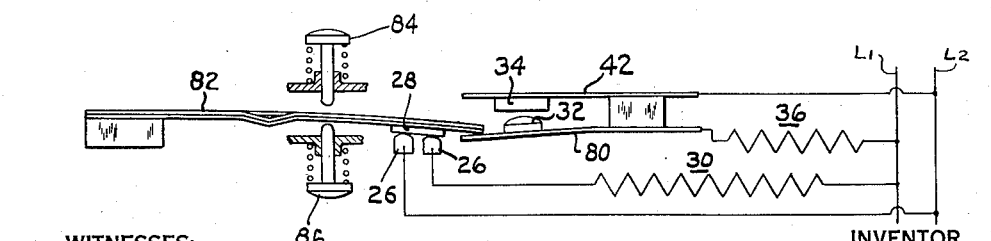
Fig. 10 is a schematic view similar to Fig. 5, but illustrating a modified form of thermostatic control.

A modification of my control is shown schematically in Fig. 10. This structure is substantially the same as the first embodiment; however, contact 32 is mounted on a flexible spring arm 80. This arm has its free end portion extending beyond the free end of a snap acting bimetal member 82 and is disposed below it. Thus, when the bimetal is curved downwardly, the spring arm 80 will be deflected downwardly and contact 32 will be disengaged from contact 34. With this construction the high wattage heater 30 alone is utilized for heating purposes during the first cycle and heater 36 remains idle during this period. When the bimetal 82 snaps upwardly to break the circuit through contacts 26 and 28, it strikes the upper flexible arm 42, moving contact 34 upwardly. Contact 32 will also rise but will not mate with contact 34, since contact 34 is beyond its range of travel. As the bimetal 82 cools, as previously described, and creeps downwardly, the contact 34 will be allowed to move downwardly until it abuts the contact 32 to complete the circuit through the low wattage heater. The low wattage heater will be thereafter intermittently energized and deenergized as the flexible arm 42 is raised or lowered alternately by the creep action of the bimetal member.

Although the bimetal member 82 may be identical with the member 12, previously described, it may be advantageous to lower its inherent snap-closing temperature to a temperature well below normal room temperatures (for example 40° F.) while still maintaining its snap-opening temperature as in bimetal member 12. A spring biased push button 84 is disposed above the bimetal, out of contact therewith but manually operable to engage the bimetal and force it downwardly. Also, a similar spring biased push button 86 is disposed below the bimetal, out of contact therewith but manually operable to force it upwardly. With this arrangement the high temperature heating cycle may be reinitiated at will by depressing the button 84 and forcing the member 82 past dead-center to its snap-closing position. Also, the high temperature heating cycle may be terminated at will and the low-temperature heating cycle initiated by depressing the button 86 and forcing the member 82 to its snap-opening position.

The control described in the second embodiment may also be utilized to advantage in the coffee maker described in connection with the first embodiment. However, with the modified control, the high wattage heater 30 is utilized alone to raise the temperature of the water to the brewing temperature and the low wattage heater is utilized only to maintain the finished brew at a lower drinking temperature. It will thus be seen that utilizing the creep action of a snap-acting bimetal member provides a thermostat which will control at two temperatures, easily and inexpensively.

While I have shown my invention in several forms, it will be obvious to those skilled in the art that it is not so limited, but is susceptible of various other changes and modifications without departing from the spirit thereof.

What I claim is:

1. A thermostatic control including a first pair of contacts; a second pair of contacts; a snap-acting bimetal member for actuating said contacts; said bimetal member being movable, when heated to a first temperature, with a snap action in one direction from a first position in which it is curved in one way to a second position in which it is curved in the opposite way; said bimetal member then being movable with a creeping action in the opposite direction upon decrease in temperature, the bimetal member being thus movable in said opposite direction to a third position, intermediate said first and second positions, in which it is curved in said opposite way, as the bimetal member is cooled to a second temperature lower than the first temperature; said bimetal member then being movable, upon further decrease in temperature below said second temperature, with a snap action to said first position; said first pair of contacts being positioned to be actuated by said bimetal member upon snap-acting movement from said first position to said second position, said second pair of contacts being positioned to be actuated by the bimetal member upon movement past a point disposed beyond said first position in said one direction, so that said second pair of contacts is actuated with a creep action after the bimetal member has snapped in said one direction and before it has snapped in said opposite direction, at a temperature above said second temperature.

2. The structure recited in claim 1 in which said point of actuation of said second pair of contacts is disposed intermediate said second and third positions.

3. A thermostatic control including a first pair of contacts; a second pair of contacts; a snap-acting bimetal member for opening and closing said contacts; said bimetal member being movable, when heated to a first or snap-opening temperature, with a snap action in contact-opening direction from a first position in which it is curved in one direction to a second position in which it is curved in the opposite direction; said bimetal member then being movable with a creeping action, in contact-opening direction upon increase in temperature and in contact-closing direction upon decrease in temperature, the bimetal member being thus movable in contact-closing direction to a third position, beyond said first position, in which it is curved in said opposite direction, as the bimetal member is cooled to a second or snap-closing temperature lower than the first temperature; said bimetal member then being movable, upon further decrease in temperature below said snap-closing temperature, in snap-closing direction to a position in which the bimetal member is curved in the first direction; said first pair of contacts being positioned to be opened by said bimetal member upon snap-acting movement from said first position to said second position, said second pair of contacts being positioned to be opened by the bimetal member upon movement past a point disposed beyond said third position in contact-opening direction and to be closed by the bimetal member upon movement past said point in contact-closing direction, so that said second pair of contacts are closed and opened with a creep action after the bimetal member has snapped in contact-opening direction and before it has snapped in contact-closing direction, within a temperature range above said second temperature.

4. The structure recited in claim 3 in which said second pair of contacts are positioned to be opened by the bimetal member upon movement past a point disposed intermediate said second and third positions in contact-opening direction, so that said second pair of contacts are closed and opened with a creep action after the bimetal member has snapped in contact-opening direction and before it has snapped in contact-closing direction, within a temperature range intermediate said first and second temperatures.

5. The structure recited in claim 3 and further including first and second heating elements, said first pair of contacts controlling a circuit through said first heating element and the second pair of contacts controlling a circuit through said second heating element, said first and second heating elements acting jointly to provide a large amount of heat and said second heating element alone thereafter acting intermittently to provide a lesser amount of heat.

6. An electric coffee maker including a vessel, a first heating element, a second heating element, and a thermostatic control comprising a first set of contacts controlling said first heating element, a second set of contacts controlling said second heating element, and a snap-acting bimetal member for opening and closing said contacts, said bimetal member being adapted to flex with a snap action in contact-opening direction to a first position of curvature when initially heated to a temperature sufficient to permit the brewing operation to be completed and to reflex with a snap action in contact-closing direction to a second position of opposite curvature at a substantially lower temperature, said bimetal member being further adapted after movement to said first position to move with a creeping action within a zone defined by said first position and a third position of lesser curvature than said first position when said member is cooled to a temperature between said brewing temperature and said lower temperature, said first set of contacts being positioned to be opened by said bimetal member upon snap-acting movement to said first position, said second set of contacts being positioned to be opened by the bimetal member upon movement past a point disposed between said first position and said third position in contact-opening direction and to be closed by the bimetal member upon movement past said point in contact-closing direction, whereby said first and second heating elements are deenergized by said member upon snap-acting movement to said first position and said second element alone is thereafter intermittently energized and deenergized by the creeping action of said member.

7. An electric coffee maker including a vessel, a first heating means, a second heating means, and a thermostatic control comprising a first set of contacts for controlling said first heating means, a second set of contacts for controlling said second heating means, and an inherently snap-acting bimetallic member for opening and closing said contacts, said bimetallic member being adapted to snap in contact-opening direction to a first position of curvature when heated to a brewing temperature and to snap in contact-closing direction to a second position of opposite curvature when cooled to a temperature below a normal drinking temperature, said first contacts being positioned to be opened by said member upon snap-acting movement to said first position, whereby said first heating means is deenergized, said member having an intermediate zone defined by said first position and a third position of lesser curvature than said first position where movement is effected by a creeping action after said first heating means is deenergized, said third position being attained by said bimetallic member when cooled to said drinking temperature, said second contacts being positioned to be opened by said bimetallic member upon movement past a point disposed in said intermediate zone in contact-opening direction and to be closed by said bimetallic member upon movement past said point in contact-closing direction, whereby said second heating means is intermittently energized and deenergized by said member upon creeping action thereof.

8. A vacuum type coffee maker having a lower water heating bowl, an upper brewing bowl in communication with said lower bowl, heating means for said lower bowl, and a thermostatic control comprising contacts for controlling said heating means and an inherently snap-acting bimetallic member for opening and closing said contacts, said bimetallic member being adapted to snap in contact-opening direction to a first position of curvature when heated to a brewing temperature and to snap in contact-closing direction to a second position of opposite curvature when cooled to a temperature substantially lower than a normal drinking temperature, said member having an intermediate zone between said first position and a third position of lesser curvature than said first position, said third position being attained by said bimetallic member when cooled to said drinking temperature, flexing within said zone being effected by a creeping action after said initial snapping, said contacts being positioned to be opened by said bimetallic member upon movement past a point disposed in said intermediate zone in contact-opening direction and to be closed by said bimetallic member upon movement past said point in contact-closing direction, whereby said bimetallic member opens said contacts by snap action on movement to said first position at the brewing temperature and thereafter intermittently closes and opens said contacts by creep action within said zone at said drinking temperature.

9. A thermostatic control having a pair of contacts; a snap-acting bimetal member for opening and closing said contacts; said bimetal member being movable, when heated to a first or snap-opening temperature, with a snap action in contact-opening direction from a first position in which it is curved in one direction to a second position in which it is curved in the opposite direction; said bimetal member then being movable with a creeping action, in contact-closing direction upon decrease in temperature and in contact-opening direction upon increase in temperature, the bimetal member being thus movable in contact-closing direction to a third position, between said first and second positions, in which it is curved in said opposite direction, as the bimetal member is cooled to a second or snap-closing temperature lower than the first temperature; said bimetal member then being movable, upon further decrease in temperature below said snap-closing temperature, in snap-closing direction to a position in which the bimetal member is curved in the first direction; said contacts being positioned to be opened by the bimetal member upon movement past a point disposed between said second and third positions in contact-opening direction and to be closed by the bimetal member upon movement past said point in contact-closing direction, so that said contacts are initially opened at said first or snap-opening temperature and are subsequently closed and opened with a creep action, within a temperature range intermediate said first and second temperatures, after the bimetal member has snapped in contact-opening direction and before it has snapped in contact-closing direction.

WILLIAM B. WALLOWER.

References Cited in the file of this patent

UNITED STATES PATENTS

| Number | Name | Date |
|---|---|---|
| 1,448,240 | Spencer | Mar. 13, 1923 |
| 1,743,073 | Simmons | Jan. 7, 1930 |
| 2,212,100 | Keaton | Aug. 20, 1940 |
| 2,262,286 | Ireland | Nov. 11, 1941 |
| 2,329,116 | Heilman | Sept. 7, 1943 |
| 2,504,728 | Purpura | Aug. 18, 1950 |